United States Patent Office 3,041,549
Patented June 26, 1962

3,041,549
TEMPERATURE CONTROL SYSTEMS
Harry J. Keen, Middletown, and Kay G. Sears, Keyport, N.J., assignors to Lavoie Laboratories, Inc., Morganville, N.J., a corporation of New Jersey
Filed May 11, 1960, Ser. No. 28,364
3 Claims. (Cl. 331—69)

This is a continuation-in-part of copending application Serial No. 760,382, now Patent No. 2,975,261.

The invention relates to temperature control systems and more particularly to a temperature control circuit of a constant temperature oven.

Constant temperature ovens are used to hold piezoelectric crystals at a constant temperature in order to maintain stable operating characteristics. A superior crystal in a closely controlled oven, can achieve an extremely high order of frequency accuracy and stability and is commonly used in generating frequency standards.

The crystals have the property of vibrating at a natural resonant frequency that is established by the geometry of the crystal. A change in temperature will effect a change in frequency of vibration that varies with the individual crystal depending on its thermal coefficient. A crystal extremely sensitive to temperature change is said to have a high thermal coefficient.

Once placed in operation a frequency standard should be allowed to operate continuously. This is important because the long term stability improves with continued aging of the crystal. If the power is removed for a period, allowing the oven temperature to change, the crystal will require a restabilization period.

It is an object of the invention to provide a compact temperature control system in a constant temperature oven capable of battery operation during periods of transportation and power failure.

A feature of the invention is the use of transistors in the electronic control circuit to control a proportional heating element in the oven.

Other objects and features and a fuller understanding of the invention may be had by referring to the following description and claims together with the drawings in which:

Figure 1:
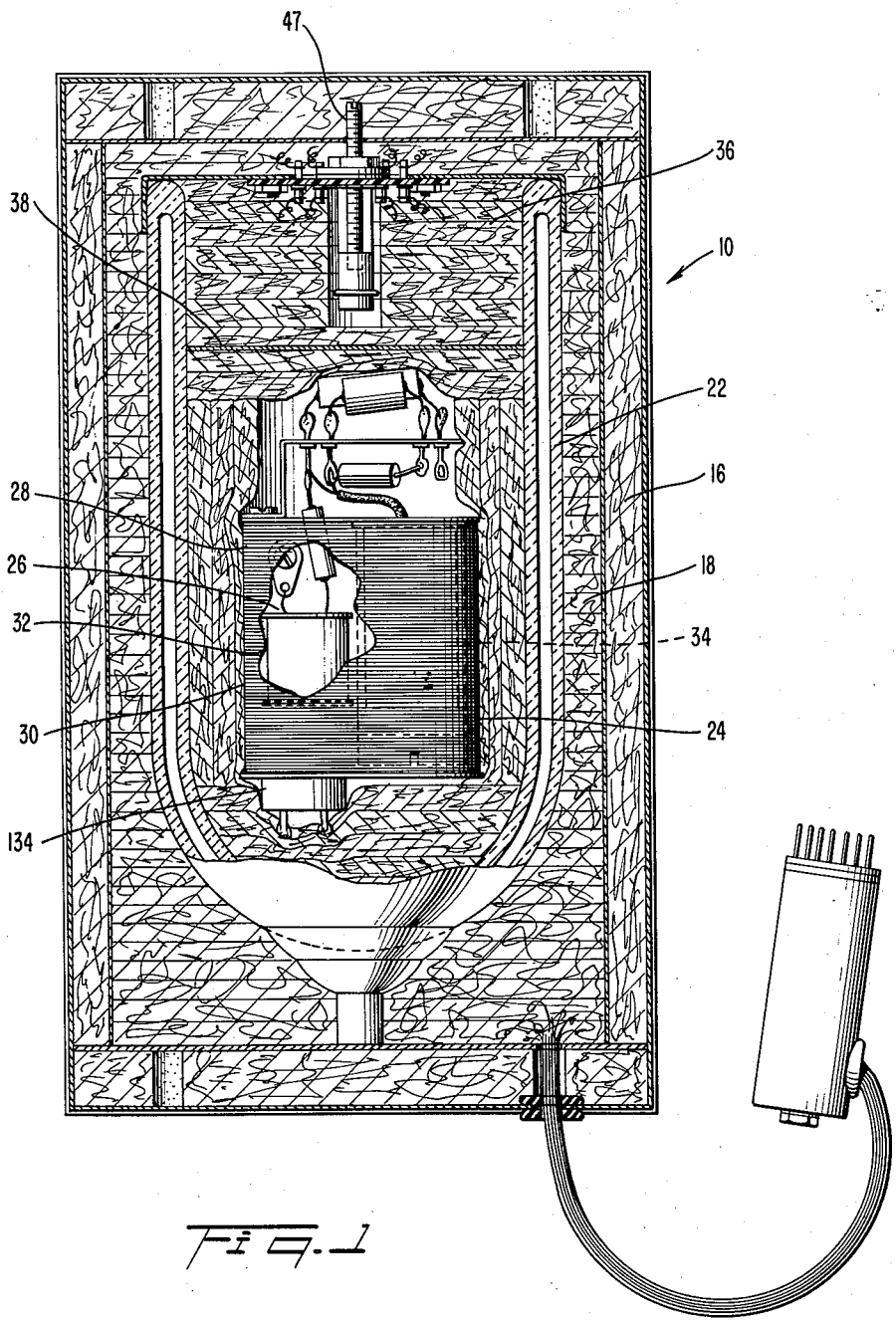
FIG. 1 is a vertical cross-sectional view of a constant temperature oven.
Figure 2:
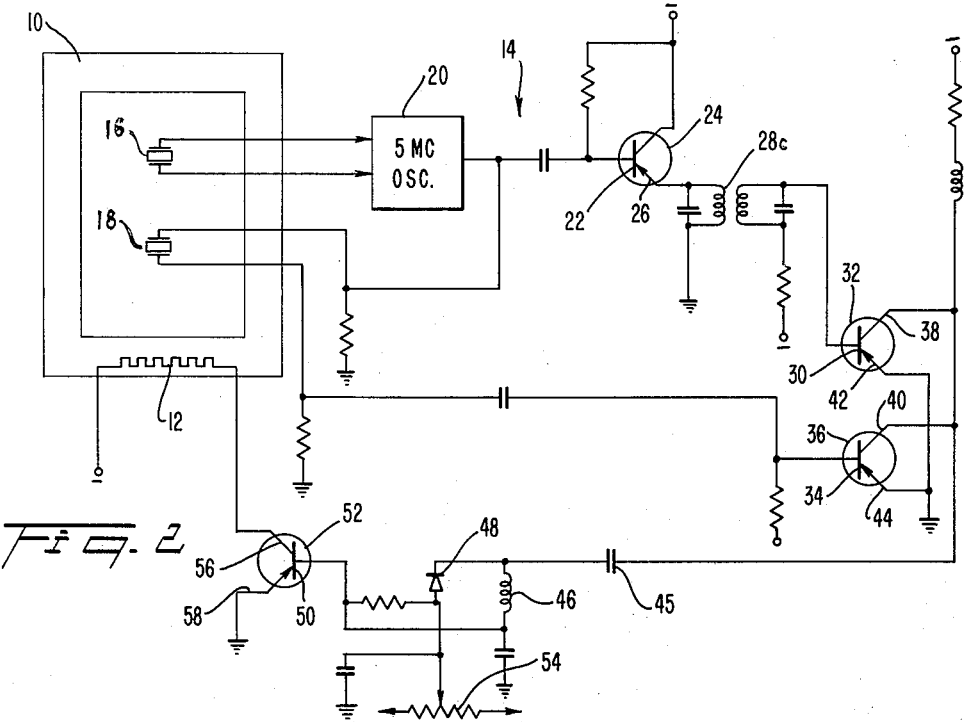
FIG. 2 is a schematic wiring diagram of a temperature control system.

The invention comprises a heavily insulated oven 10 having a proportional heating element 12 and an electronic control circuit 14. The oven 10 is designed to receive and to keep at a constant temperature a piezoelectric crystal 16 which is the source of a standard frequency, for example, 5 megacycles at an operating temperature, of say 75° C. The crystal 16 is cut to have a low thermal coefficient and is used in association with another piezoelectric crystal 18 with an equal vibration frequency but having a high thermal coefficient. Together the crystals control the energization of the heater 12 by means of the control circuit 14 as hereafter described.

The control circuit 14 comprises a 5 megacycle oscillating circuit 20 for receiving the 5 megacycle signal generated in the crystal 16 and to excite the crystal 18 to vibrate at its natural resonant frequency of approximately 5 megacycles, depending upon temperature. The signal from the oscillating circuit 20 is coupled to the base 22 of a PNP transistor 24 which is connected as an emitter follower amplifier. The amplified signal is taken from the emitter 26 and passed through an over-coupled transformer 28 where the phase of the signal is shifted approximately 90°. The phase shifted signal from the crystal 16 is then fed to the base 30 of another PNP transistor 32.

The crystal 18 is coupled to the base 34 of a third PNP transistor 36. The circuitry provides a phase shift such that the signal from the crystal 18 to the transistor 36 is at the same frequency and in phase with the signal from the crystal 16 to the transistor 32 when the oven is at an operating temperature of, for example, 75° C. The collectors 38 and 40 of transistors 36 and 32 respectively are connected in parallel and the emitters 42 and 44 are grounded. The transistors 32 and 36 are biased to be fully conducting when no signals originating from the crystals are applied to the bases 30 and 34.

The signal output from the parallel collectors 38 and 40, is coupled through a capacitor 45 to an inductor 46 and a diode 48. A signal voltage is developed across conductor 46 and the diode 48 and is polarized to short out the negative portion of the signal voltage. The remaining positive portion of the signal voltage is applied as a bias to the base 50 of a PNP power transistor 52. The emitter 58 of transistor 52 is connected to ground and the collector 56 is connected to one terminal of the proportional heater 12. The other terminal of heater 12 is connected to a negative voltage supply, thus the energizing current through the heater 12 is controlled by transistor 52. The transistor 52 is negatively biased through the potentiometer 54 to be normally conductive in the absence of a positive signal voltage from the diode 48.

When initially energized the oven is generally far below the crystal's operating temperature of 75° C. The crystal 18 having the high thermal coefficient oscillates at a frequency much further removed from the standard frequency than the crystal 16 having the low thermal coefficient. The dissimilar frequencies from the crystals arriving at the bases 30 and 34 of the transistors 32 and 36 act to unequally bias to nonconduction the transistors so that at any given moment either one or the other transistor is left fully conducting. The low impedance of either transistor when fully conducting holds the parallel connected collectors 38 and 48 close to ground potential, therefore no signal is applied to the inductor 46 through the capacitor 45 and the transistor 52 continues to normally conduct and the proportional heater 12 continues to be energized by the power supply.

As the oven nears the operating temperature the frequency of the high thermal coefficient crystal approaches the standard 5 megacycles and the difference between the high and low thermal coefficient crystals decrease finally to zero. As this state approaches the cyclic intervals during which the transistors 32 and 36 are nonconducting begin to overlap, the overlap increasing as the difference in frequency of the oscillating crystals decreases, causing pulses of increasing long duration to appear at parallel connected collectors 38 and 40. These pulses are applied to the inductor 46 through capacitor 45 and develop a signal voltage which is rectified by the diode 48 to provide an increasingly positive bias to the power transistor base 50. The positive bias reduces the conduction of the transistor 52 thereby reducing the current flowing to the heater 12 and its heat output. The system therefore provides a proportional oven temperature control, the energizing current applied to the heater being an inverse function of the oven temperature.

Figure 3:
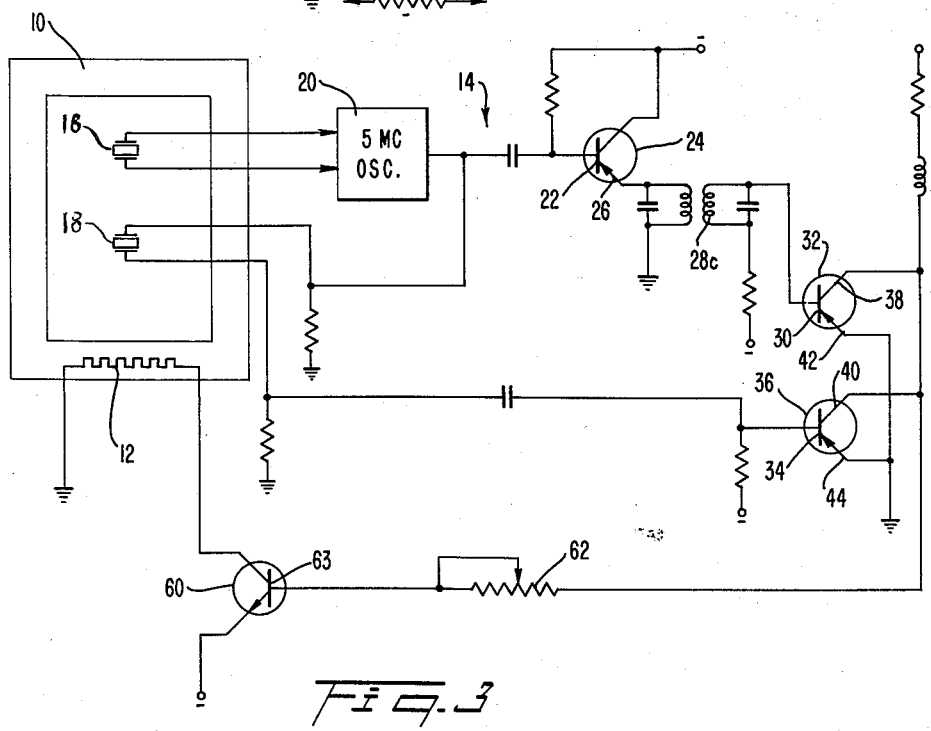
FIG. 3 is similar to FIG. 2 showing another embodiment of the invention.

Referring to FIG. 3 another embodiment of the invention provides for the substitution of an NPN power transistor 60 for the PNP power transistor 52. With this substitution the output of the transistors 32 and 36 is coupled to the base 52 of the NPN transistor 60 through a bias adjusting rheostat 62. The NPN power transistor then controls the energizing current of the proportional heater 12 as in the first embodiment. The invention has been described with a certain degree of particularity, it is understood however, that the present disclosure has been made only by way of example and that numerous changes in the detail of construction and the combination and arrangement of parts may be resorted to without departing from the spirit and scope of the invention as hereinafter claimed.

What we claim and desire to secure by Letters Patent is:

1. In a lightweight portable constant temperature oven, an improved temperature control system for heating said oven to a preselected temperature and maintaining said preselected temperature therein from outside sources of negative electrical energy comprising in combination: an electrical heating element connected for energization from a said outside source; a first piezoelectric crystal having a low thermal coefficient and a second crystal with a high thermal coefficient, both said crystals having the same natural resonant frequency at said preselected temperature and being mounted in said oven; an oscillator circuit connected to said first crystal for generating a crystal controlled standard frequency signal output, part of said output being applied to excite said second crystal to vibrate at its natural resonant frequency; a first transistor connected as an emitter follower amplifier with its base connected to receive said standard frequency signal, and having its collector negatively biased from a said outside source; connecting means connecting the emitter output of said first transistor and said second crystal respectively to the respective bases of a second and a third transistor, said transistors having their collectors connected in parallel and having their emitters connected and grounded, and being biased from a said outside source to be fully conducting when no signals from the first transistor and the second crystal are respectively impressed on said bases, said connecting means being arranged to present the respective signals from said first transistor and second crystal to their respective second and third transistors bases at the same frequency and in phase when said oven is at its said preselected temperature, whereby said second and third transistors are biased by said signals to cyclic nonconducting overlap in their output, that has an amplitude proportional to the pulses produced by said overlap and inversely proportional to the frequency difference between the standard frequency signal and the signal from the said second crystal; a power transistor connected between the heating element and ground by its emitter and collector, the base of said power transistor connected to receive the combined signals of the second and third transistors, said power transistor being biased from a said outside source to be normally conducting when no said combined signal is impressed on its base from said second and third transistors, whereby said power transistor acts as an electronic rheostat, the resistance of which is continuously variable by said combining signals to control the energization of said heater.

2. Improved electronic control means as described in claim 1 characterized in that said power transistor is of the PNP type, and said bias applying means comprises a potentiometer for applying a negative bias to said transistor, thereby causing it to be normally conducting, and an inductor and a diode coupled to said combined signals of the second and third transistors, the inductor for developing a signal voltage, and the diode for rectifying the developed signal voltage to pass only the positive portion, said positive portion of the signal voltage being applied as a positive bias to said PNP power transistor to restrict its conduction proportional to said bias, and thereby restricting the conduction of said transistor and the energizing of the heater element as said signals from the first transistor and the second crystal approach frequency coincidence.

3. Improved electronic control means as described in claim 1 and characterized in that said power transistor is of the NPN type and said bias applying means comprises a rheostat coupling the said combined signals of the second and third transistors to the base of said power transistor, said rheostat for biasing said transistor to be normally conducting in the absence of the said combined signals and for developing a signal voltage from said combined signals to bias said NPN transistor toward nonconductivity proportional to the amplitude of said combined signals.

References Cited in the file of this patent

UNITED STATES PATENTS

| | | |
|---|---|---|
| 1,907,132 | Thurston | May 2, 1933 |
| 2,167,480 | Hansell | July 25, 1939 |